United States Patent
Corbin (10) Patent No.: US 11,014,587 B2
(45) Date of Patent: May 25, 2021

(54) TRACK GEOMETRY MEASUREMENT SYSTEM WITH INERTIAL MEASUREMENT

(71) Applicant: HARSCO TECHNOLOGIES LLC, Fairmont, MN (US)

(72) Inventor: John C. Corbin, Fairfax, VA (US)

(73) Assignee: HARSCO TECHNOLOGIES LLC, Fairmont, MN (US)

( * ) Notice: Subject to any disclaimer, the term of this patent is extended or adjusted under 35 U.S.C. 154(b) by 200 days.

(21) Appl. No.: 15/937,739

(22) Filed: Mar. 27, 2018

(65) Prior Publication Data

US 2018/0273060 A1    Sep. 27, 2018

Related U.S. Application Data

(60) Provisional application No. 62/477,249, filed on Mar. 27, 2017.

(51) Int. Cl.
| | |
|---|---|
| *B61K 9/08* | (2006.01) |
| *G01P 15/14* | (2013.01) |
| *G01P 15/18* | (2013.01) |
| *G01B 5/00* | (2006.01) |
| *G01C 1/00* | (2006.01) |

(52) U.S. Cl.
CPC .............. *B61K 9/08* (2013.01); *G01B 5/0004* (2013.01); *G01C 1/00* (2013.01); *G01P 15/14* (2013.01); *G01P 15/18* (2013.01)

(58) Field of Classification Search
CPC ........... B61K 9/08; G01P 15/18; G01P 15/14; G01C 23/00
See application file for complete search history.

(56) References Cited

U.S. PATENT DOCUMENTS

| | | | |
|---|---|---|---|
| 4,573,131 A | | 2/1986 | Corbin |
| 5,036,594 A | * | 8/1991 | Kesler ............... E01B 35/02 104/7.2 |
| 5,332,180 A | * | 7/1994 | Peterson ............ B61L 3/004 246/3 |
| 5,791,063 A | * | 8/1998 | Kesler ............... E01B 35/00 33/1 Q |
| 5,986,547 A | * | 11/1999 | Korver ............... G01S 5/0247 246/121 |

(Continued)

FOREIGN PATENT DOCUMENTS

| | | |
|---|---|---|
| JP | 11-257942 A | 9/1999 |
| JP | 2001063570 A | 3/2001 |

(Continued)

OTHER PUBLICATIONS

An International Search Report and Written Opinion issued by the International Searching Authority dated Jul. 16, 2018 in connection with International Patent Application No. PCT/US2018/024661.

(Continued)

*Primary Examiner* — Helen C Kwok
(74) *Attorney, Agent, or Firm* — Norton Rose Fulbright US LLP (57) ABSTRACT

A track geometry measurement system includes a plurality of wheels, a frame, and an inertial measurement unit. The inertial measurement unit is coupled to the frame and includes at least one gyroscope.

19 Claims, 4 Drawing Sheets

(56) References Cited

U.S. PATENT DOCUMENTS

| | | | | |
|---|---|---|---|---|
| 6,397,129 | B1* | 5/2002 | Lanoix | B61F 5/22 105/199.2 |
| 6,415,522 | B1* | 7/2002 | Ganz | B61K 9/08 33/1 Q |
| 8,914,162 | B2* | 12/2014 | Kernwein | B61K 9/08 701/1 |
| 2002/0077733 | A1 | 6/2002 | Bidaud | |
| 2004/0122569 | A1* | 6/2004 | Bidaud | B61K 9/08 701/19 |
| 2005/0065726 | A1* | 3/2005 | Meyer | B61L 25/023 701/470 |
| 2007/0246612 | A1* | 10/2007 | Patko | B61K 9/08 246/34 R |
| 2009/0076742 | A1* | 3/2009 | Xia | B61K 9/08 702/41 |
| 2010/0004804 | A1* | 1/2010 | Anderson | B61K 9/08 701/19 |
| 2012/0059624 | A1* | 3/2012 | Madhavan | G01B 11/007 702/153 |
| 2012/0203487 | A1* | 8/2012 | Johnson | G01P 21/00 702/104 |
| 2012/0274772 | A1* | 11/2012 | Fosburgh | B61K 9/08 348/149 |
| 2014/0142868 | A1* | 5/2014 | Bidaud | G01N 21/8803 702/40 |
| 2014/0277824 | A1* | 9/2014 | Kernwein | B61L 25/025 701/1 |
| 2014/0297069 | A1* | 10/2014 | Landes | E01B 35/00 701/19 |
| 2016/0002865 | A1* | 1/2016 | English | B61K 9/08 356/72 |
| 2017/0029001 | A1* | 2/2017 | Berggren | G01M 5/0091 |
| 2017/0080960 | A1* | 3/2017 | Moeller | B61L 23/047 |
| 2018/0057029 | A1* | 3/2018 | Maurice | B61K 9/08 |
| 2018/0143017 | A1* | 5/2018 | Choi | B61K 9/08 |
| 2018/0222504 | A1* | 8/2018 | Birch | B61L 3/008 |
| 2018/0339720 | A1* | 11/2018 | Singh | G06K 9/4604 |

FOREIGN PATENT DOCUMENTS

| | | | |
|---|---|---|---|
| JP | 2006162630 | A | 6/2006 |
| JP | 3958566 | B2 | 8/2007 |

OTHER PUBLICATIONS

Partial Supplementary European Search Report issued in corresponding Patent No. 18774639.1 dated Dec. 18, 2020.

* cited by examiner

TRACK GEOMETRY MEASUREMENT SYSTEM WITH INERTIAL MEASUREMENT

CROSS-REFERENCE TO RELATED APPLICATIONS

This application claims priority to U.S. Provisional Application No. 62/477,249, filed Mar. 27, 2017, the entire contents of which is incorporated herein by reference in its entirety.

BACKGROUND

Railroads are typically constructed to include a pair of elongated, substantially parallel rails, which are coupled to a plurality of laterally extending ties. The ties are disposed on a ballast bed of hard particulate material such as granite. Over time, normal operations on the railroad may cause the rails to deviate from a desired geometric orientation.

Rail maintenance processes for addressing such concerns typically involve the use of chord measurement devices, which provide a reference system to measure the position of the track prior to applying the desired corrections to the track. An illustrative correction process involves lifting rail with mechanical clamps, aligning the track by shifting it to a calculated lateral position, and then tamping the ballast under each tie to hold the track in the desired position. This work sequence is typically repeated at each tie during the course of the correction process.

Reference points are used to establish a geometry of the track at the particular location being worked. An onboard computer may compare the previous section of track already corrected to the current section and makes the calculations for the required corrections to be made at the work heads.

In the railway industry, track geometry measurement may be used to measure the spatial relationship of the rails with reference to one another or other reference points. The resulting data from these measurement systems may be used to specify various maintenance activities, such as tamping.

The precision and accuracy of the track geometry measurement requirements vary based on operations. In the case of a high speed line on which trains travel at a high speed (for example over 200 kph), an acceptable wavelength for track deviations can be quite high. For example, to damp oscillations and limit suspension movement at a frequency of 1 Hz, a distance of a wavelength from a peak through a valley to a next peak may be 200 m or greater. For slower speed lines (<100 kph), wavelengths of 20 m are considered.

Track maintenance activities may include calculating a correction to the track geometry, based on either a smoothing of the measured track, or with reference to a defined location in space. During tamping activities the track position may be changed in the area of only some millimeters up to several centimeters. Thus, very precise measurements over long distances may be needed.

For some of these corrections (tamping to an absolute track position and not only smoothing of the track geometry) additional measurements are carried out to acquire the absolute position of the track relative to track-side reference points considered to be fixed in space. Such reference points are often mounted on catenary masts, other fixed objects, survey markers, etc.

To measure absolute position of the track at discrete locations, the position of the track may be measured relative to reference points by manual or semi-manual measurement using hand laser tools and D-GPS. However, measurements using these methods are time-intensive (hand laser tools) and relatively inaccurate (D-GPS—when used for measurements under a normally used period of time).

Measurements carried out with laser measurement systems to acquire the position of the track relative to the track-side reference points may be used for tamping operations. However, these laser measurement systems require a first operator team in front of the vehicle to place measurement equipment on the track rails to measure the position of the track. A second operator team is required behind the vehicle to place measurement equipment on the track rails after the vehicle has performed work to verify the adjusted position of the track. The presence of the operator team working on the track also leads to safety personnel being required to secure the work of the measurement team. In sum, 2-6 persons per tamping shift may be required to perform these measurements. Thus, laser measurement systems are slow and labor intensive. Further, laser measurement generally requires some kind of operator interaction to carry out.

To obtain accurate measurements carried out with a D-GPS system, the system may be required remain stationary for an extended period of time, sometimes many hours, to obtain enough data to average to determine an accurate absolute location suitable for tamping operations. Such an approach is not practical.

BRIEF SUMMARY

The present disclosure generally relates to a track geometry measurement system with inertial measurement.

In an example, a track geometry measurement system includes a plurality of wheels, a frame, and an inertial measurement unit. The inertial measurement unit is coupled to the frame and includes at least one gyroscope.

In another example, a track measurement system includes a plurality of wheels, a frame, an inertial measurement unit, and a processor. The inertial measurement unit is coupled to the frame and includes at least one sensor. The processor is configured to obtain a first measurement from the sensor at a first location, to obtain a second measurement from the sensor at a second location, and to determine a first difference between the first and second measurements.

BRIEF DESCRIPTION OF THE DRAWINGS

Reference is now made to the following descriptions taken in conjunction with the accompanying drawings.

DETAILED DESCRIPTION

Various aspects of a track geometry measurement system with inertial measurement and related methods according to the present disclosure are described. It is to be understood, however, that the following explanation is merely exemplary in describing the devices and methods of the present disclosure. Accordingly, any number of reasonable and foreseeable modifications, changes, and/or substitutions are contemplated without departing from the spirit and scope of the present disclosure.

Inertial measurement units using accelerometers are available but are either very high cost or do not have sufficient accuracy for the small tolerances of track geometry measurement. For example, many smart phones now have small, inexpensive accelerometers that provide support for, for example, compasses or shaking gestures. These are low accuracy applications.

The present disclosure provides a track geometry measurement system that uses gyroscopes to supplement or replace accelerometers in an inertial measurement unit for the measurement of alignment and surface of track. The gyroscopes may be mechanical such as a spinning wheel type or solid state such as a vibrating structure type. MEMS devices may also be used.

An exemplary advantage of gyroscopes, hereinafter referred to as a "gyro," is that the random walk of a gyro may increases with time to the ½ power whereas the random walk of an accelerometer may increases with time to the 3⁄2 power. Bias errors, always present in accelerometers, increase as time squared. Accelerometers may be included in the track geometry measurement system, for example, as inclinometers as their inertial properties are better suited to this application.

Another exemplary advantage of gyro devices is that measurements may be taken at very low speeds. Accelerometers require high speeds to detect displacements that can be recorded and begin to display significant noise at speeds below 15 mph. A gyro device can record accurate measurements below 15 mph or even lower such as below 5 mph, and also accommodate sustained stops.

Figure 1:
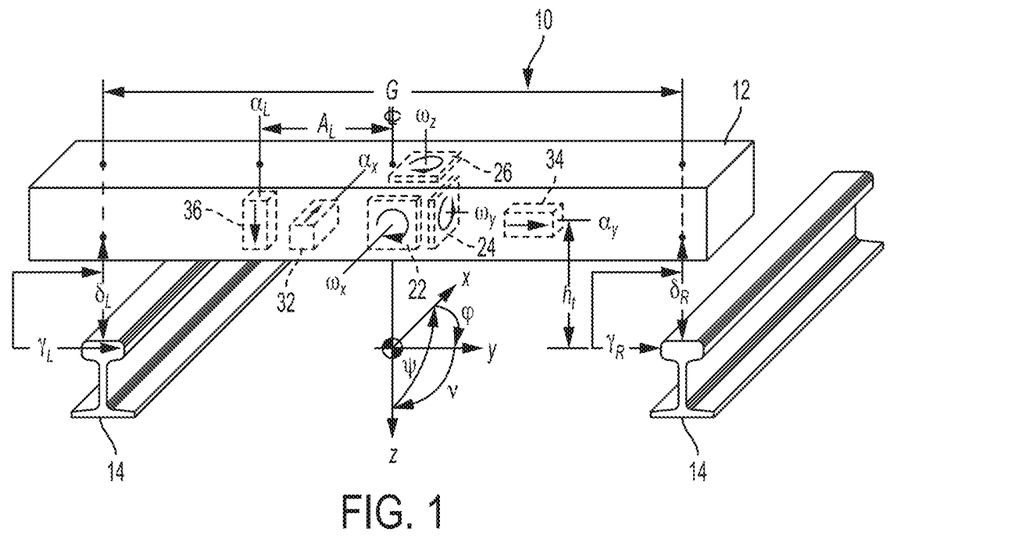
FIG. 1 is a perspective view of an exemplary measurement system.

Referring to FIG. 1, an inertial measurement unit 10 is coupled to a frame member 12 of a rail vehicle that travels along rails 14. The frame member 12 may also be referred to as a beam. The inertial measurement unit 10 may include a beam roll gyro 22, a beam pitch gyro 24, a yaw gyro 26, a longitudinal inclinometer 32, a lateral inclinometer 34, and a vertical accelerometer 36. The longitudinal inclinometer 32 may provide gradient information. The lateral inclinometer 34 may provide cross level information. The longitudinal inclinometer 32 and the lateral inclinometer 34 may respectively be provided by accelerometers. While discrete instruments are illustrated in FIG. 1, it will be appreciated that the gyros and/or accelerometers may also be provided in a combined package. A distance measuring device, such as a laser distance measuring device or Gocator, may also be included to provide a non-contact reference to the gauge and surface points of the rail 14.

In FIG. 1, the following right-handed coordinate system is illustrated:
  A positive x-coordinate, pointing obliquely into the page, corresponds to the normal forward direction of travel.
  A positive y-coordinate points to the horizon on the right.
  A positive z-coordinate points down vertically into the ground.
  An angle, $\varphi$, describes local deviations in heading, or yaw angle. The positive sense of this is a rotation about the z-axis such that the +x-axis rotates toward the +y-axis, i.e. curving to the right.
  An angle, $\vartheta$, describes local deviations in roll. The positive sense of this is a rotation about the x-axis such that the +y-axis rotates toward the +z-axis, i.e. left rail high.
  An angle, $\psi$, describes local deviations in pitch angle. The positive sense of this is a rotation about the y-axis such that the +z-axis rotates toward the +x-axis, i.e. ascending a grade.

The frame member 12 supports measurements that relate its position relative to each rail 14 and to an inertial reference. These are shown in FIG. 1 as follows:
  $\gamma L$ Offset to the gauge point of the left rail.
  $\gamma R$ Offset to the gauge point of the right rail.
  $\delta L$ Offset to surface of the left rail.
  $\delta R$ Offset to surface of the right rail.
  $\omega x$ Output of the beam roll gyro.
  $\omega y$ Output of the beam pitch gyro.
  $\omega z$ Output of the beam yaw gyro.
  $\alpha x$ Output of the beam longitudinal inclinometer.
  $\alpha y$ Output of the beam lateral inclinometer.
  $\alpha z$ Output of the beam vertical accelerometer.

FIG. 1 also illustrates dimensional symbols that may be referred to as parameters in geometry equations:
  G Nominal distance between the surface points of the two rails 14. For example, in standard gauge, this is 1511 mm (59.5"). Some railways elect to round this distance to 1500 mm.
  Ht Height of the sensitive axis of the lateral inclinometer 34 above the gauge plane of the rail 14. For example, this may nominally be 16 mm (5⁄8") below the rail surface.
  AL Horizontal position of the vertical accelerometer 36 relative to the center of the beam 12. As shown, the unit is to the left of the beam center so the value of $A_L$ is negative.
  AR Horizontal position of a right vertical accelerometer if present.
  g Gravitational acceleration due to gravity.

The track measurement system may also include a wheel-driven tachometer. The wheel-driven tachometer may be provided by a wheel 42 of a track measurement vehicle 40 (see, for example, FIGS. 3-5). The wheel-driven tachometer may also be provided by a separate wheel that is operably coupled to the wheel 42 or rail 14. The wheel-driven tachometer may register track position. The wheel-driven tachometer may also provide a precise distance-based sampling interval for use in geometry determinations. For example, the wheel-driven tachometer may directly provide signals, or the signals may be derived from the output of the wheel-driven tachometer, for speed (v) and Time-Between-(distance-based)-Samples (TBS or T). Filters, such as those discussed in further detail below, that generate space curves and chords may use the distance-sampled domain. In an example, the distance-sampled domain is identified based on a signal of the wheel-driven tachometer.

Yaw and Pitch Sense
First Finite Differences

Figure 2:
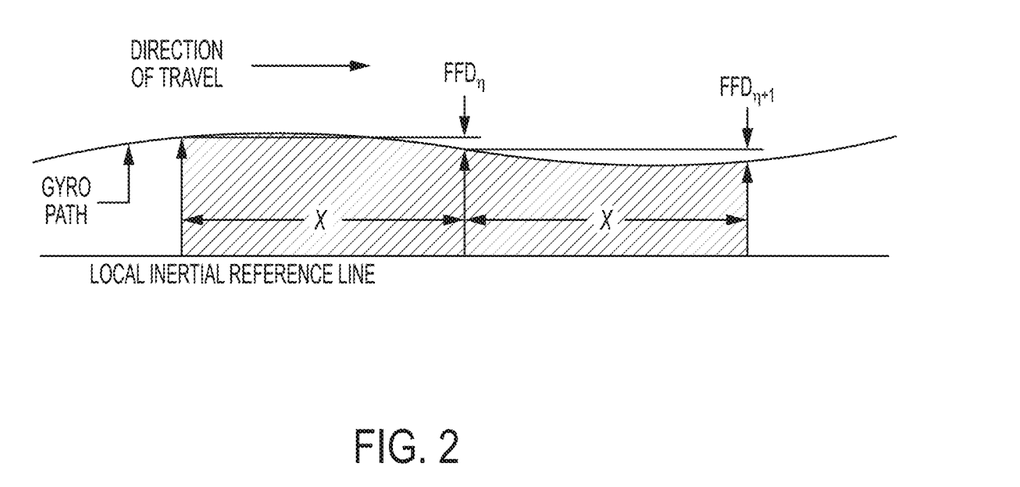
FIG. 2 is a plot illustrating an exemplary first finite difference of a gyro path.

FIG. 2 illustrates a first finite difference (FFD) derived from a gyro path. The units of gyros are degrees or radians per second. A change in angle experienced by the gyro may be determined by scaling the output of the gyro by the Time-Between-Samples T. When radians are used, or the degree-based output is converted to radians, multiplying by the sample distance X scales the output to provide the FFD of the path. In the example of the yaw gyro 26, the FFD of the path corresponds to alignment. In the example of the pitch gyro 24, the FFD of the path corresponds to the surface plane.

Delay Adjustment

Figure 3A:
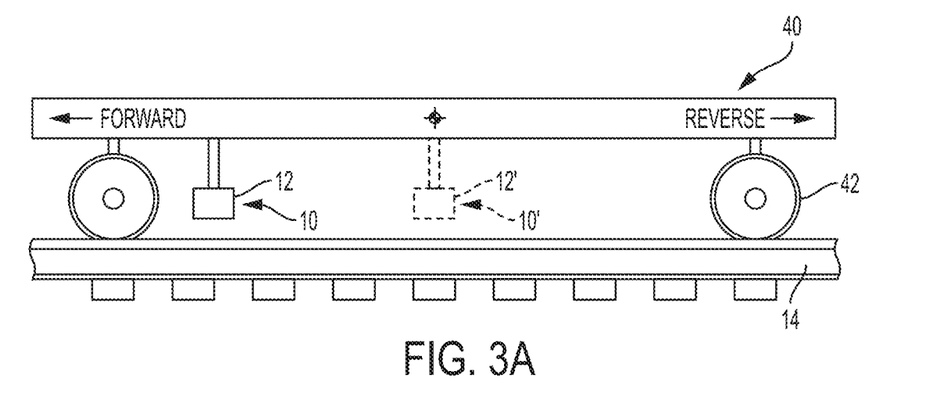
FIG. 3A is a side view of a simplified track maintenance vehicle.
Figure 3B:
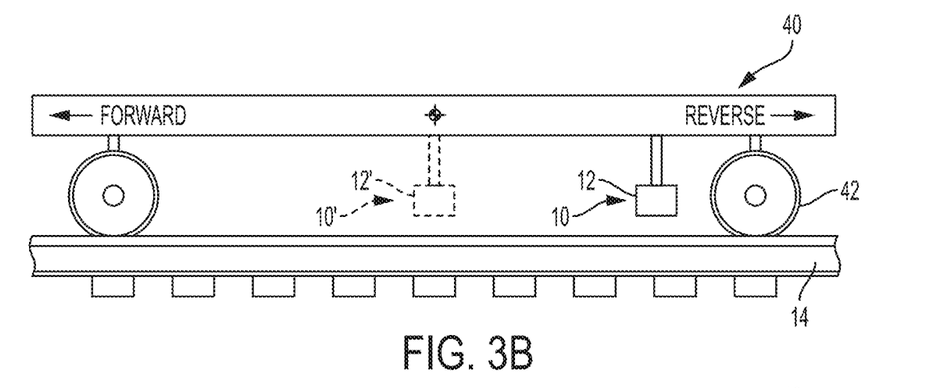
FIG. 3B is a side view of a simplified track maintenance vehicle.

With reference to FIGS. 3A and 3B, delay adjustments for direction and beam placement will now be discussed. In the example where the wheelbase of the track measurement vehicle 40 is sufficiently long and the track measurement vehicle 40 is sufficiently rigid, the yaw and pitch measurements of the inertial measurement unit 10 may be approximately the same regardless of the location of the inertial measurement unit 10 on the track maintenance vehicle 40. If this does not occur for a particular track measurement vehicle 40, then a delay adjustment may be performed to align the measurements in a virtual position. For example, the gauge-surface measurements may be delayed until they are lined up in a virtual position with gyros, or the gyros may be delayed until they line up with gauge-surface measurement.

In an example, forward is indicated by +1 and reverse by −1. A leading gauge-surface measurement unit has positive value and trailing gauge-surface measurement unit has a negative value is negative. When the product of the direction of travel and the gauge-surface measurement unit is positive, then the gauge-surface measurement may be delayed until it aligns with a virtual position proximal to the midpoint of the track measurement vehicle 40. When the product of the direction of travel and the gauge surface measurement unit is negative, then the yaw and pitch measurements may be delayed until they align with the actual gauge-surface measurement. The pitch gyro may measure the centerline of the track. The surface of individual rails may be provided by superelevation or crosslevel variations. The amount of delay may be calculated based on the speed or displacement of the track maintenance vehicle 40 as provided by the tachometer.

With reference to FIG. 3A, the beam 12 and inertial measurement unit 10 are disposed forward of respective virtual center locations 10' and 12'. In the case of forward travel, the system leads and gauge and surface measurements are delayed to mid positions. In the case of reverse travel, the system trails and yaw and pitch measurements are delayed to align with gauge and surface measurements.

With reference to FIG. 3B, the beam 12 and inertial measurement unit 10 are disposed aft of respective virtual center locations 10' and 12'. In the case of forward travel, the system trails and yaw and pitch measurements are delayed to align with gauge and surface measurements. In the case of reverse travel, the system leads and gauge and surface measurements are delayed to mid positions.

Geometry Measurements

The track measurement system preferably includes at least one inertial measurement unit. In some embodiments, for example, where the bogey sideframe is less rigid, two or more inertial measurements may be included. Where more than one inertial measurement system is included, a laser distance measuring device. The inertial measurement units may include the same or different sensors. For example, if the bogey sideframe is not sufficiently rigid, a partial or full inertial measurement unit may be included at a far-beam. A far beam may be disposed distally from a beam at which a primary inertial measurement unit is disposed. An advantage of including multiple partial or full inertial measurement units is that the track measurement system may perform well in a variety of bogeys at a variety of speeds including low speeds less than 15 mph or less than 5 mph and signal stops.

Figure 4:
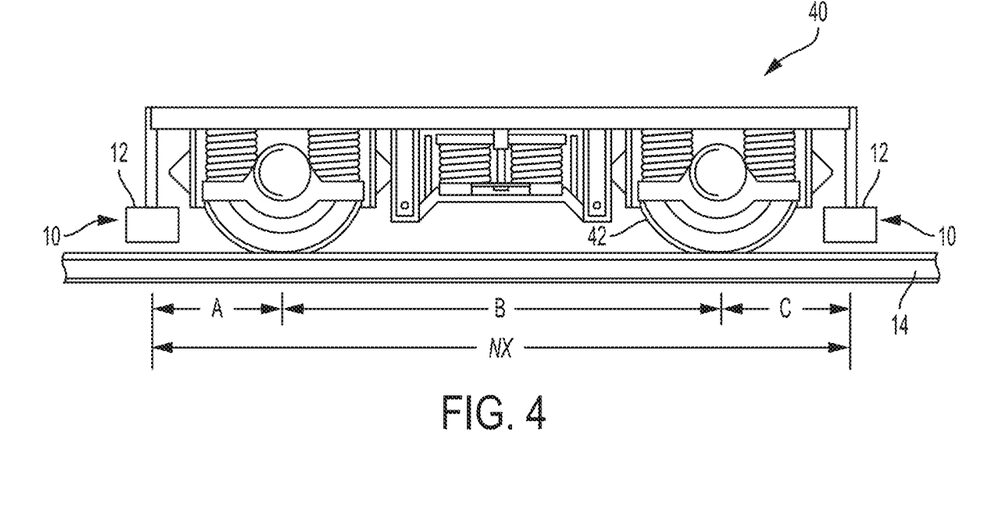
FIG. 4 is a side view of a track maintenance vehicle.

Referring to FIG. 4, a track maintenance vehicle 40 may include a first inertial measurement unit 10 disposed at a first beam 12 proximal a forward end of the track maintenance vehicle 40. A second inertial measurement unit 10 may be disposed at a second beam 12 proximal a rear end of the track maintenance vehicle 40. The first inertial measurement unit 10 may be disposed a distance A from a first axle of the track maintenance vehicle 40. The second inertial measurement unit 10 may be disposed a distance C from a second axle of the track maintenance vehicle 40. The first axle may be disposed a distance B from the second axle. In an example, A is 750 mm, B is 2500 mm and C is 750 mm. In a metric system, the track measurement system may sample the inertial measurement units at a 250 mm rate. In that example, N is 16. In a non-metric system such as the US, a one foot sample rate may produce an N of 14. The bogey (track maintenance vehicle) is not limited to two axles. For example, a 3-axle configuration with an 11 foot wheelbase may also be used.

Double Finite Difference

Figure 5A:
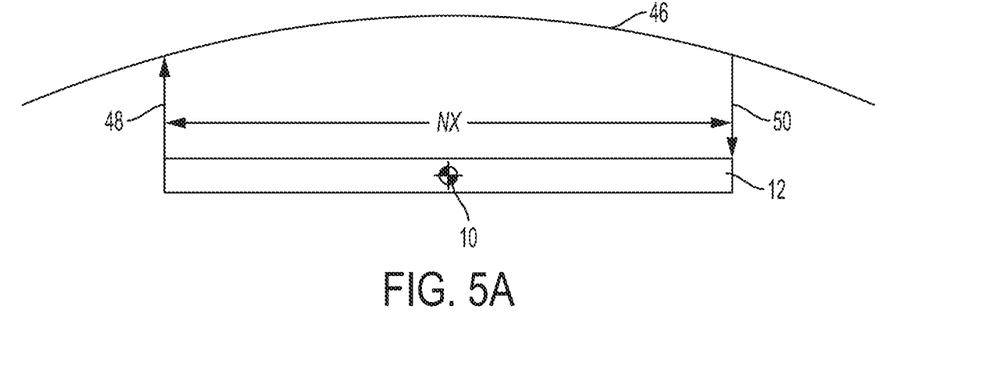
FIG. 5A is a plot illustrating a measurement in a double finite difference determination.
Figure 5B:
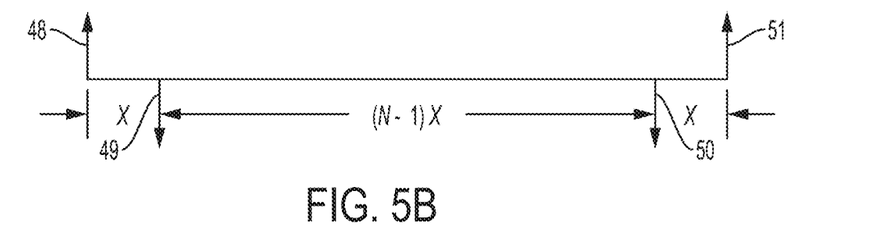
FIG. 5B is a plot illustrating a determination of a double finite difference.
Figure 5C:
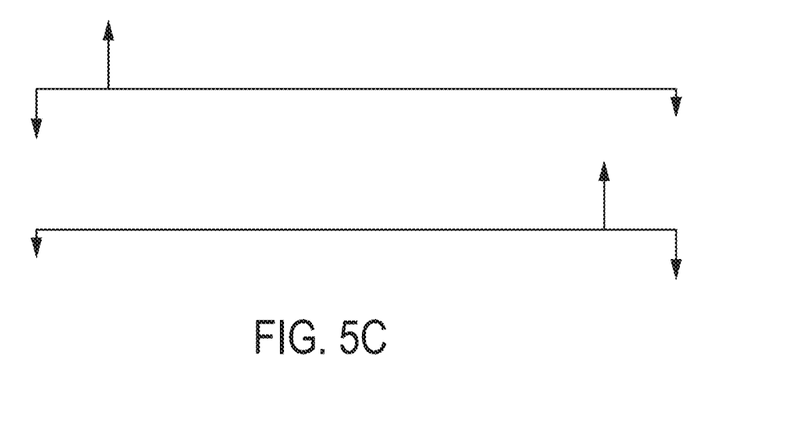
FIG. 5C is a plot illustrating a determination of a double finite difference.

Referring to FIG. 5, determining a double finite difference will be described. FIG. 5A illustrates a gyro path 46, a beam 12 having a length NX, and a inertial measurement unit 10 disposed (or virtually disposed) proximal a center of the beam 12. First finite differences 48 and 50 may be calculated, for example as discussed with respect to FIG. 2. The first finite difference 48 may be calculated at a first sample location and a second finite difference 49 may be calculated at a second sample location. The difference between the two measurements is scaled by T to provide the second finite difference 49. Similarly, a second finite difference 51 may be calculated as a first finite difference one sample distance from the first finite difference 50, and a difference between the two first finite difference measurements is scaled by T to provide the second finite difference 51. The second finite difference is preferably calculated with gyro units of radians.

In the example of a metric sample distance of 250 mm, (¼ m) then the double finite difference may be expressed as DFD (16, 1). For the more general case, DFD (N, 1), the spatial frequency response is given by $D(\phi)=4 \sin(N\pi\phi X) \sin(\pi\phi X)$ where $\phi$ is spatial frequency in cycles per unit distance. X may be expressed in same distance units such as meters or feet.

The double finite differences may be applied in several ways. One is to use a class of filters that support a document on chords. This class of filters may include, an emulation of a Mauzin track measurement car, a moving Fourier transform, and a multiple family third order integrating filter class. For a DFD (N, 1), the multi-family may be set up using a value of N. Each of the individual integrations may be tied together by using a common debiaser. This technique was successfully applied to an 8' twist to provide cross level variations. It performed extraordinarily well when compared to cross level variations determined by processing the difference between two vertical accelerations.

In the example shown, one of the parameters supplied in setting up the filter may be 16 (20 in the case of a 200 mm sample distance). The individual families are tied together by using a common debiaser.

A bias that may occur in measurements is a small indication of rotation when the gyro is still, an offset error in the measurement, etc. Those errors may propagate and increase in the calculation of the FFD and DFD. Thus, debiasing may be used to limit the effect of biasing errors. In an example, a triple window filter may be applied to integrate the double finite differences. The result may be debiased using a quad window integration. In another example, a pre-whitening filter may be applied to the double finite differences, and a moving Fourier transform applied to filter the measurements in the frequency domain.

Space chord filters may provide as an output the geometry associated with the measurement. For example, space chord filters applied to DFDs of the pitch gyro measurements may provide grade information of the track; space chord filters applied to DFDs of the roll gyro may provide crosslevel information of the track; space chord filters applied to DFDs of the yaw gyro measurements may provide lateral alignment information of the track.

It will also be appreciated that other filtering and geometry processing may be applied. For example, the double finite difference of the gyroscope measurements may be applied to filtering techniques designed for linear accelerometers that accept a double finite difference as an input. While it is not strictly necessary to calculate a double finite difference to determine space curve information from gyroscope measurements (an exemplary advantage of the gyroscope), determining the double finite difference allows for the application of filter sets designed for linear accelerometer data. The gyroscope data is more accurate particularly at low speeds. Thus, the disclosure also provides an improvement to performance of other filtering approaches.

It will also be appreciated that further processing of the DFD is option and that the DFD itself may be used as an output representing track geometry.

Referring to FIG. 5C, the DFD may also be decomposed into two mirror image asymmetrical chord offsets. Asymmetrical chord offsets may be used by tamping machines to align the track. Thus, the decomposed mirror image asymmetrical chord offsets based upon the gyro measurements may be incorporated in a tamping machine to align the track.

In some embodiments, the described processes and determinations may be executed by a special purpose processor/computer or a general purpose processor programmed to execute the process. For example, the determinations may also be in the form of computer executable instructions that, when executed by a processor, cause the processor to execute the correction process. The computer executable instructions may be stored on one or more computer readable mediums (e.g., RAM, ROM, etc) in whole or in parts.

Figure 6:
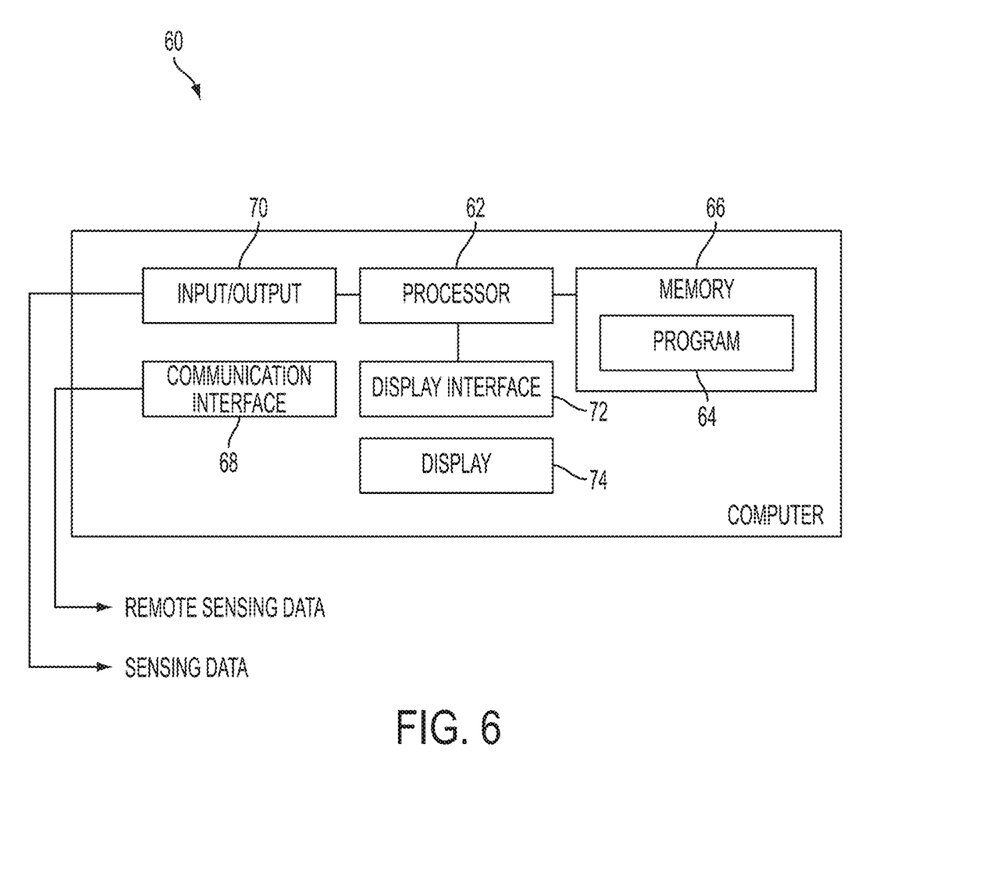
FIG. 6 illustrates a data processing system for carrying out measurements according to the present disclosure.

For example, referring to FIG. 6, some embodiments of a computer or data processing system 60 may include a processor 62 configured to execute at least one program 64 stored in a memory 66 for the purposes of processing data to perform one or more of the techniques that are described herein. The processor 62 may be coupled to a communication interface 68 to receive remote sensing data. The processor 62 may also receive the sensing data via an input/output block 70. In addition to storing instructions for the program, the memory 66 may store preliminary, intermediate and final datasets involved in the techniques that are described herein. Among its other features, the computer or data processing system 60 may include a display interface 72 and a display 74 that displays the various data that is generated as described herein. It will be appreciated that the computer or data processing system 60 shown in FIG. 6 is merely exemplary (for example, the display may be separate from the computer, etc) in nature and is not limiting of the systems and methods described herein.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

What is claimed is:

1. A track geometry measurement system, comprising:
   a track measurement vehicle comprising:
      a plurality of wheels configured to travel along rails of a rail track;
      a frame coupled to the wheels, the frame having a first end and a second end; and
      a first inertial measurement unit (IMU) coupled to the frame at a first location that is closer to the first end than to the second end, the first IMU including one or more first gyroscopes; and
   a processor configured to:
      obtain measurement data from the first IMU;
      determine a first finite difference between at least two data points of the measurement data for the one or more first gyroscopes
      determine a gauge-surface measurement value based on a direction of travel of the track measurement vehicle;
      determine a delay time based on the gauge-surface measurement value; and
      delay a measurement of the one or more first gyroscopes by the delay time.

2. The track geometry measurement system of claim 1, wherein:
   the one or more first gyroscopes comprises:
      a pitch gyro configured to measure pitch
      a roll gyro configured to measure roll; and
      a yaw gyro configured to measure yaw;
   the first finite difference of the yaw gyro corresponds to alignment of the rail track; and
   the first finite difference of the pitch gyro corresponds to surface plane of the rail track.

3. The track geometry measurement system of claim 1, wherein the processor is further configured to delay the measurement until the one or more first gyroscopes align with a reference position proximal to a midpoint of the frame.

4. The track geometry measurement system of claim 1, wherein the one or more first gyroscopes of the first inertial measurement unit include a plurality of first gyroscopes, and the plurality of first gyroscopes are discrete, and wherein the measurement data is in radians.

5. The track geometry measurement system of claim 1, further comprising a second inertial measurement unit (IMU) coupled to the frame at a second location that is closer to the second end than to the first end, the second IMU including one or more second gyroscopes.

6. A track geometry measurement system, comprising:
   a rail vehicle comprising:
      a plurality of wheels operable to trail over rail track; and
      a frame coupled to the wheels;
   an inertial measurement unit (IMU) coupled to the frame, the IMU including at least one gyroscope; and
   a processor coupled to the IMU, the processor configured to:
      obtain a first measurement from the at least one gyroscope at a first location;
      obtain a second measurement from the at least one gyroscope at a second location that is spaced from the first location by a first sample distance in a direction parallel to a rail of the rail track;

perform a finite difference calculation to determine a first finite difference of the first and second measurements for the first sample distance; and determine a first double finite difference based on the first finite difference of the first and second measurements.

7. The track geometry measurement system of claim 6, wherein the processor is further configured to:

obtain a third measurement from the at least one gyroscope at a third location that is spaced from the second location by a second sample distance, and determine a second finite difference between the second and third measurements.

8. The track geometry measurement system of claim 7, wherein the processor is further configured to scale a difference between the first finite difference and the second finite difference by a time factor to determine the first double finite difference.

9. The track geometry measurement system of claim 8, wherein the time factor is related to the first sample distance between the first measurement and the second measurement.

10. The track geometry measurement system of claim 6, wherein the at least one gyroscope includes a first gyroscope oriented to measure pitch, a second gyroscope oriented to measure roll, and a third gyroscope oriented to measure yaw.

11. The track geometry measurement system of claim 6, wherein:

the frame includes a horizontal beam; and the IMU is coupled to a center of the horizontal beam.

12. The track geometry measurement system of claim 11, wherein the IMU includes:

a tachometer;

a first accelerometer configured to measure longitudinal gradient and disposed on the horizontal beam at a first distance from the center of the horizontal beam; and a second accelerometer configured to measure vertical acceleration and disposed on the horizontal beam at a second distance from the center of the horizontal beam; and a third accelerometer configured to measure lateral acceleration and disposed on the horizontal beam at a third distance from the center of the horizontal beam.

13. The track geometry measurement system of claim 6, wherein:

the at least one gyroscope includes a plurality of gyroscopes; and the plurality of gyroscopes of the IMU are discrete.

14. The track geometry measurement system of claim 6, wherein:

the at least one gyroscope includes a plurality of gyroscopes; and the plurality of gyroscopes of the IMU are integrated.

15. The track geometry measurement system of claim 6, wherein the processor is configured to apply one or more filters to the first double finite difference to provide grade information of the rail track, crosslevel information of the rail track, or lateral alignment information of the rail track and wherein the filter is a moving Fourier transform, a multiple family third order integrating filter, or a space chord filter.

16. The track geometry measurement system of claim 8, wherein the time factor comprises a time-between-samples.

17. A method of measuring track geometry measurement, the method comprising:

obtaining a first measurement from a gyroscope coupled to a train at a first location;

obtaining a second measurement from the gyroscope at a second location that is spaced from the first location by a first sample distance;

determining a first finite difference between the first and second measurements;

obtaining a third measurement from the gyroscope at a third location that is spaced from the second location by a second sample distance;

determining a second finite difference between the second and third measurements; and determining a first double finite difference of the first finite difference and the second finite difference.

18. The method of claim 17, wherein the determining the first double finite difference comprises:

determining a difference between the first finite difference and the second finite difference; and scaling the difference by a time factor.

19. The method of claim 17, further comprising:

filtering the first double finite difference; and based on the filtered first double finite difference, outputting grade information of a track, crosslevel information of the track, lateral alignment information of the track, or combination thereof.

* * * * *